US005825948A

United States Patent [19]

Sirkis et al.

[11] Patent Number: 5,825,948

[45] Date of Patent: Oct. 20, 1998

[54] FIBER OPTIC SENSOR FOR SPATIALLY SEPARATED ELEMENTS IN A SYSTEM

[76] Inventors: James S. Sirkis, 14430 Turbridge Ct., Burtonsville, Md. 20866; Yaowen Li, 6100 Breezewood Dr., #202, Greenbelt, Md. 20770; Christopher J. LaVigna, 3759 Carrisa La., Olney, Md. 20832

[21] Appl. No.: 889,738

[22] Filed: Jul. 8, 1997

[51] Int. Cl.[6] .......... F41G 1/54

[52] U.S. Cl. .......... 385/12; 33/240

[58] Field of Search .......... 385/12, 13; 33/234, 33/235, 240, 241

[56] References Cited

U.S. PATENT DOCUMENTS

| | | | |
|---|---|---|---|
| 5,224,182 | 6/1993 | Murphy et al. | 385/12 |
| 5,367,583 | 11/1994 | Sirkis | 385/12 |
| 5,572,609 | 11/1996 | Li et al. | 385/12 |

*Primary Examiner*—John D. Lee
*Assistant Examiner*—Juliana Kang
*Attorney, Agent, or Firm*—Watson Cole Grindle Watson, P.L.L.C.

[57] ABSTRACT

A fiber optic sensor employs tapered fiber optics in a tapered gun barrel. The fiber optic sensor employs a single-mode optical fiber, a light source supplying light to the single-mode fiber and at least one tapered dual-mode optical fiber secured to the barrel in a longitudinal direction. The single-mode fiber is spliced to with an end of a proximal one of the dual-mode fibers for carrying the light signal. A partial reflector is inserted between the dual-mode fibers to partially reflect and partially transmit light. A reflector is coupled to a distal end the dual-mode fiber, at the open end of the muzzle of the gun, to reflect the transmitted light. A coupler couples the single-mode fiber to the proximal dual-mode fiber. A coherent multiplexer is connected to the coupler for receiving and multiplexing the reflected light. A processor is responsive to the multiplexer for processing the multiplexed sensing information. The dual-mode fiber is tapered inversely with respect to the tapered muzzle to simplify the processing function. When two or more dual-mode fibers are employed, an offset splice is provided between the dual-mode fibers. A method is also disclosed.

24 Claims, 3 Drawing Sheets

D
D3
15
10
14
LM
L3
D2
20
L2
12
AG
16
LT
θ
AT
DT 48B
42A
48A
37B
40A
37A
36A
36B
52A
51
50
62
64
CDM
54
60
58

AG
15
48
34
32
42
22
46
40
20
36
37
16
30
34
θ
AT
52
50
51
56
58
54
COHERENT DIVISION MULTIPLEXER
60
62
Σ
64'

FIBER OPTIC SENSOR FOR SPATIALLY SEPARATED ELEMENTS IN A SYSTEM

BACKGROUND OF THE INVENTION

The invention relates to a fiberoptic sensor for determining the relative positionment between elements in a system. In a particular exemplary embodiment, the invention pertains to a dual-mode optical fiber sensor capable of measuring the slope of a tapered gun barrel relative to a trunnion support.

Proper orientation of an elongated system is dependent on accurate knowledge of the relative positionment of various reference points in the system. For example, in order to aim a long range heavy gun it is necessary to obtain an accurate measurement of the gun angle, i.e., the angle that the gun barrel makes with the horizontal. Similar information is required in applications requiring long boom positionment, aiming of gunship cannons and other like. The present invention uses a tapered gun as an exemplary embodiment. However, the invention is not so limited.

Tapered gun barrels have a complex geometry necessitated by performance, materials and cost considerations. As hereinafter described, the complex geometry causes nonlinear deformation in the gun barrel and thus makes it difficult to accurately measure the gun angle.

Conventional gun barrel sensor technology uses lasers and mirrors to measure the gun angle. Such structures are fragile and relatively massive. In particular, conventional sensor technology undesirably affects the dynamics and alignment of the gun barrel, and emits an optical signal which may be used by the enemy for targeting the gun for return fire.

Fiber optic sensors have a number of advantages over conventional sensor technology. One advantage is that these sensors are lightweight and small enough that they may be unobtrusively secured to the gun barrel without degrading its structural integrity. Another advantage is that a fiber optic sensor may be multiplexed to effectively form multiple sensors along a single axis without a substantial increase in the size and weight.

It is known to use fiber optic sensors to analyze various structural parameters, e.g., strain, temperature, pressure, electric and magnetic fields, and vibrations. However, conventional fiber optic sensors have uniform core geometry and thus perform poorly when measuring the slope in deformable tapered structures.

SUMMARY OF THE INVENTION

It is therefore an object of the invention to provide a method and apparatus for determine the relative position of spatially separated reference points in a system where deformation can change such relative positions.

It is another object of the invention to employ a fiber optic sensor to sense the angle of a tapered gun barrel without adversely affecting the integrity of the operation of the gun.

It is a further object of the invention to provide a method and apparatus for simplifying the process of measuring the slope of a tapered gun barrel at the muzzle relative to its trunnion.

The foregoing objects are achieved according to the present invention by employing a specialized fiber optic sensor in an elongated system.

In a particular embodiment, the fiber optic sensor comprises a single-mode optical fiber, a light source supplying light to the single-mode fiber and at least two tapered dual-mode optical fibers cascaded end-to-end in a longitudinal direction within a gun barrel. Splicing means connects the single-mode fiber with an end of a proximal one of the dual-mode fibers for carrying the light signal. A controlled offset splice designed to produce two modes in the distal sensor is inserted between the dual-mode fibers. Reflective means coupled to an end of the distal one of the dual-mode fibers located at the open end of the muzzle of the gun reflects the transmitted light. Coupling means couples the single-mode fiber to the proximal dual-mode fiber. Coherent division multiplexing means is connected to the coupling means for receiving and multiplexing the reflected light. Processing means is responsive to the multiplexing means for processing the multiplexed sensing information. The dual-mode fibers have cores with a propagation constant inversely proportional to the radii of the tapered barrel. In one embodiment, that radius of the core is tapered at an angle in a longitudinal direction such that the radii of the dual-mode fibers are proportional to the radius of the tapered barrel. Alternatively, the dual-mode fibers have an index of refraction which varies in inverse proportion to the radius of the tapered barrel so as to produce a corresponding inverse variation in the propagation constant of the fiber.

In yet another embodiment, the dual-mode fibers may carry separate fibers in parallel paths along the gun barrel.

The present invention also provides a method for sensing operation of reference points in a system. In the exemplary embodiment, the angle of a tapered gun barrel may be determined.

Other features and advantages of the invention will become apparent upon reference to the following description and read in light of the attached drawings.

DESCRIPTION OF THE INVENTION

Figures 1, 4:
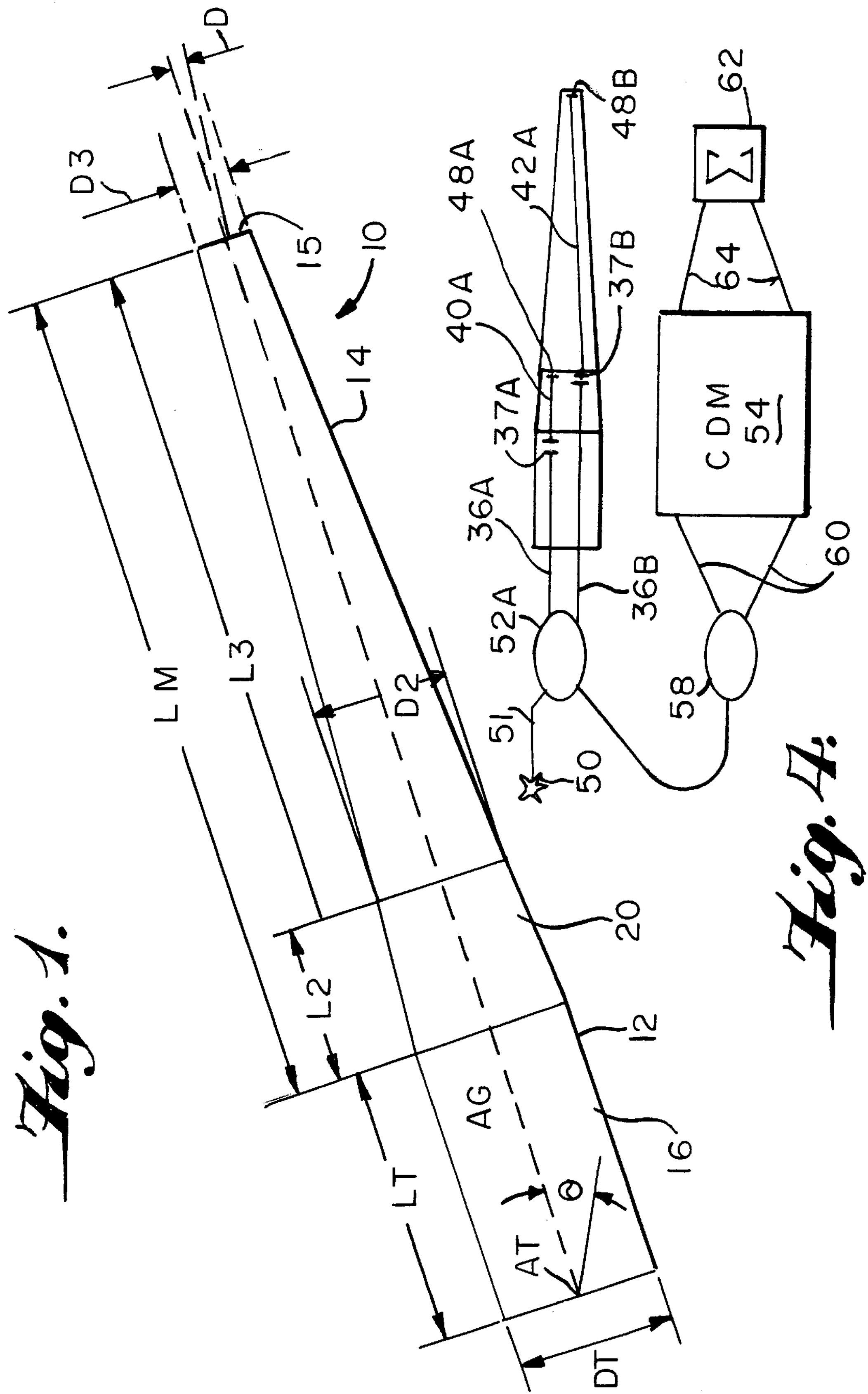
FIG. 1 is a schematic diagram of a tapered gun.
FIG. 4 is an illustration of an alternative embodiment of the invention.

FIG. 1 shows schematically a tapered cannon or a long gun 10 having a gun axis $A_G$, the gun barrel 12 has a muzzle portion 14 with an open muzzle end 15 and a trunnion portion 16 is adapted to be carried for rotation about a trunnion axis $A_T$ in a gun carriage, not shown. The gun 10 may be disposed at a gun angle $\ominus$ for aiming.

In the example herein described, the muzzle portion 14 has a length LM of about 4,831 mm. The trunnion 16 has a length LT of about 1,419 mm and a uniform cylindrical shape having a diameter DT of about 305 mm. The muzzle portion 14 has a relatively short intermediate tapered section 20 extending from the trunnion 16 and having a length L2 and an initial diameter corresponding to that of the trunnion and a final diameter D2 of about 260 mm. The muzzle portion 14 also has a long terminal end section 22 having a length L3, an initial diameter of 206 mm corresponding to the diameter D2 of the intermediate section 20 and a final diameter D3 of about 115 mm at the muzzle end 15. Of course other size guns may be employed. Also, the invention is applicable to other elongated systems which may be deformable and where the relationship between reference points in the system is important.

The gun 10 is tapered in order to reduce the materials requirements and to reduce the weight, as noted above. When the gun is rotated about the trunnion axis $A_T$, the heavy weight of the gun causes deflection D in the muzzle portion 14, especially near the muzzle end 15 when the angle $\ominus$ is near the horizontal. The deflection D, which is exaggerated for clarity, changes the nominal gun angle $\ominus$ so that aiming accuracy is adversely affected unless a correction is made. The complex gun geometry, however, makes it difficult to calculate and compensate the deflection D for each gun angle $\ominus$. The present invention provides a method and apparatus for aiming the gun with accurate deflection compensation.

Figure 2A:
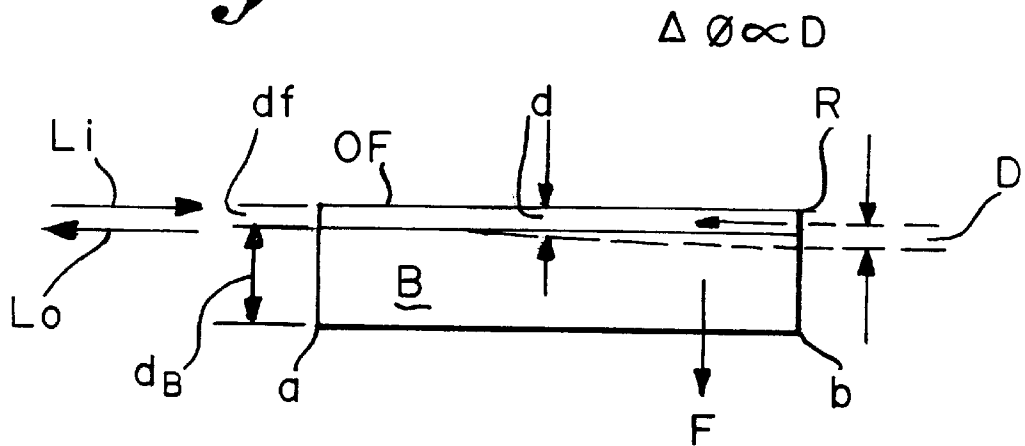
FIG. 2A is a schematic diagram illustrating the transmission of light in a uniformly stressed optical fiber.

FIG. 2A illustrates an arrangement where an optical fiber OF carried on a uniform beam-like body B having a uniform diameter $d_B$. Uniform forces acting on the body result in a uniform deflection D along its entire length from A to B. The fiber OF has an input/output end I/O into which light $L_i$ is launched. The opposite end of the fiber has a reflector R producing reflected light $L_r$. The reflected light $L_r$ is returned along the fiber and received as output light $L_o$. The forces F acting on the body causing its deflection also produces a corresponding strain in the fiber. The strain in the fiber affects the propagation of various modes of light in the fiber so that a phase change $\Delta\phi$ in the propagation of various modes in the fiber may be measured and therefore provide an indication of the deflection D. In other words, those forces acting to deform the body also deform the fiber causing an induced stress which is sensible as change in the propagation of light in the fiber.

In the example, the phase change $\Delta\phi$ may be expressed as follows:

$$\Delta\phi=\Delta\phi_0+\int_a^b(\Delta\beta(x)x\epsilon(x,t))dx \quad (1)$$

where $\Delta\phi_0$ is the initial phase difference, $\beta(x)$ is the propagation constant, $\Delta\beta(x)$ is the difference in the propagation constants of two propagation modes in the fiber and $\epsilon(x,t)$ represents the strain applied to the fiber resulting from the deformation, and A and B are the end points of the fiber.

For the beam-like structure or body B, the $\epsilon(x,t)$ may be expressed as follows:

$$\epsilon(x,t)=\frac{h(x)}{2}*\frac{\delta\theta}{\delta x}(x) \quad (2)$$

where h(x) represents the diameter of the body and $\ominus$ represents the slop or orientation of the body B.

Figure 2B:
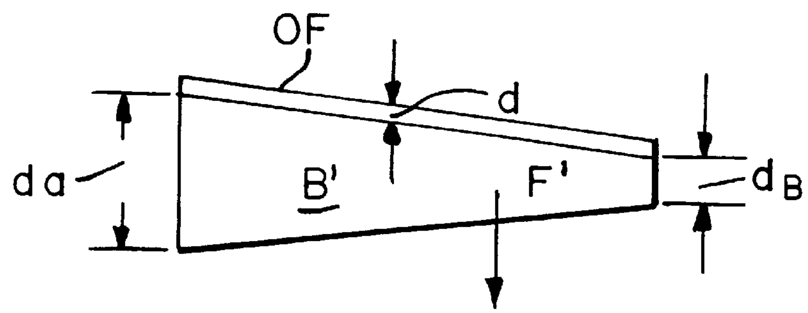
FIG. 2B is a schematic diagram illustrating the transmission of light in a stressed optical fiber nonuniformly.

For a simple beam-like body in the form of a cylinder with a constant diameter (FIG. 2A), evaluation of the integral in equation (1) is relatively straightforward. However, if the geometry of the body carrying the fiber is complicated, evaluation of the integral is difficult. For example, in FIG. 2B, the body B' is a tapered beam-like structure having diameters $d_A$ and $d_B$ at the respective ends and the fiber OF has a uniform diameter $d_f$. The forces F' acting on the body are not uniform with slope $\ominus$. Accordingly, the resulting deflection of the body produces corresponding non-uniform stresses in the fiber. This makes evaluation of the integral difficult.

Figure 2C:
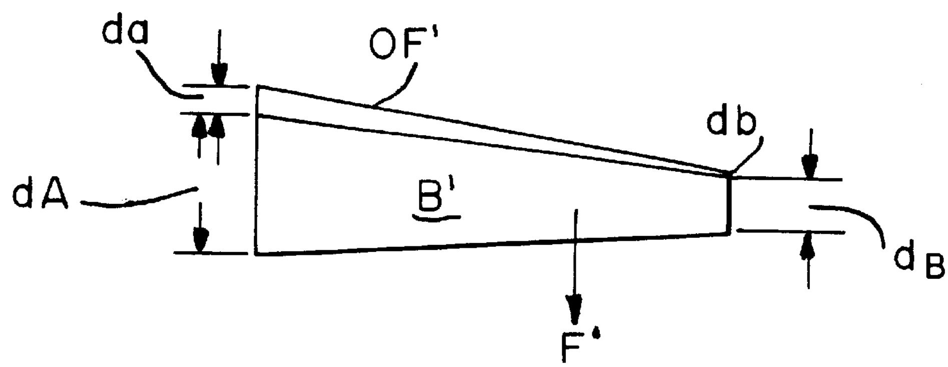
FIG. 2C shows the concept of the invention utilizing a tapered fiber on an elongated tapered object.

In accordance with the invention, as shown in FIG. 2C, the fiber may be a tapered optical fiber OF' having a taper which is proportional to the taper of the body. Thus, the component of the integral in equation (1) which affects the propagation constant is a complement of the component of the integral which represents the strain or force so that:

$$\Delta\beta(x)*\frac{h(x)}{2}=C \quad (3)$$

where C is a constant.

Thus, the equation (1) reduces to $$\Delta\phi=\Delta\phi_0+C(\ominus_a-\ominus_b) \quad (4)$$

where $\ominus_a$ is the slope at end a and $\ominus_b$ is the slope at end b $(\ominus_a-\ominus_b)$ represents the deflection $D_A$.

Evaluation of the integral of equation (1) is therefore greatly simplified.

Figure 3:
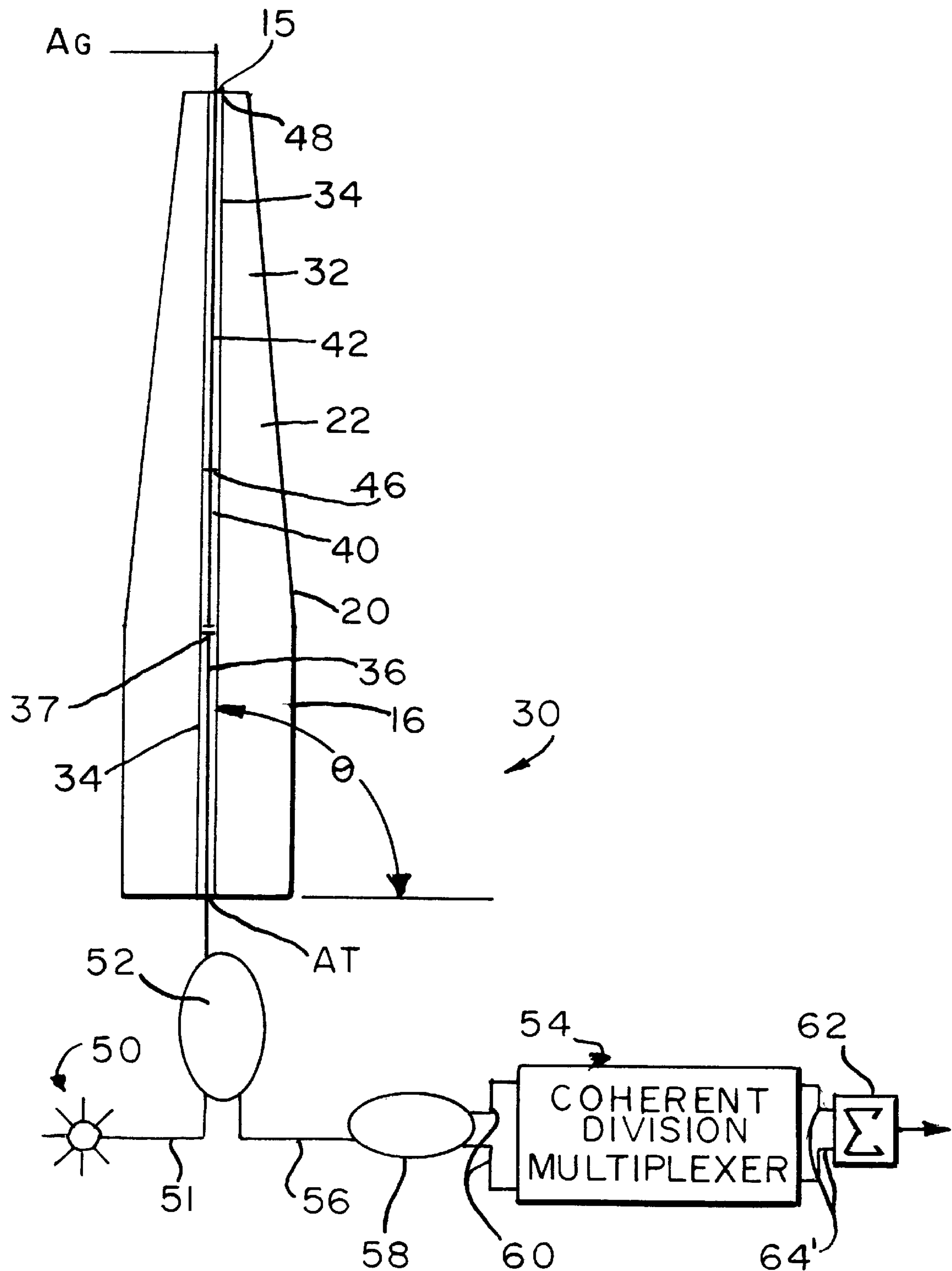
FIG. 3 is a schematic diagram of an optical fiber sensor according to an exemplary embodiment of the invention which has been incorporated into the tapered gun illustrated in FIG. 1.

A fiber optic sensing system 30 in accordance with the invention is shown in FIG. 3 secured to a modified gun barrel 32 which is similar in most respects to the gun barrel 12 of FIG. 1. However, in the exemplary embodiment, the gun barrel 32 is formed with a groove 34 extending along the length thereof for receiving fiber optic components of the invention hereinafter discussed. Other satisfactory mounting arrangements for the fiber may also be employed as desired.

Fiber optic sensing system 30 includes a fiber lead in/out in the form of a single-mode fiber 36 (hereinafter I/O fiber 36) secured within the groove 34 in the trunnion section 16. A first sensing fiber 40 is connected to the I/O fiber 36 in the intermediate section 20 and a second sensing fiber 42 is connected to the first sensing fiber in the end section 22 of the gun barrel 32. The I/O fiber 36 is a single-mode fiber having an elliptical or E-core. The first and second sensing fibers 40 and 42 comprise dual mode fibers likewise having elliptical cores capable of carrying two different light modes (i.e., $LP_{01}$ and $LP_{11}$).

The I/O fiber 36, the first sensing fiber 40 and the sensing fiber 42 are connected end-to-end, as shown. A spatial offset splice 46 is formed on the distal end of the first sensing fiber 40 at the connection with the corresponding proximal end of the second sensing fiber 42. A reflector 48 is provided at the distal end of the second sensing fiber 42 at the muzzle end 15 of the gun barrel 32, as shown.

The I/O fiber 36 is connected to a broad band light source 50, for example, a super luminescent diode (SLD) type via an input fiber 51 and first coupler 52. The I/O fiber 36 is also connected to a coherent division multiplexer 54 by a fiber 56, a second coupler 58 and input fibers 60 for the multiplexer. The first and second couplers 52 and 58 may be two-fiber, four-port couplers (i.e., two-by-two couplers) having a splitting ratio of 50%. Outputs for the coherent division multiplexer 54 are coupled to a summer 62 by a output fibers 64 of the multiplexer.

As noted, the first and second sensing fibers 40 and 42 comprise dual-mode fiber optics having an elliptical or E-core capable of carrying two differentiable light modes $LP_{01}$ and $LP_{11}$. Further, in accordance with the invention, in order to compensate for the gun barrel taper, the first and second sensing fibers 40 and 42 are tapered proportional to the corresponding portion of the gun barrel diameter associated therewith. For example, the first sensing fiber 40 is tapered inversely to the ratio D1 over D2 of the intermediate gun barrel section 20; and the second sensing fiber 42 is tapered proportional to the diameter ratio D2 over D3 of the tapered end section of the gun barrel 32.

The coherent division multiplexer 54, which includes an interferometer therein, senses differing optical path differences from the first and second sensing fibers 40 and 42.

These are matched with the light generated by the light source 50 by respective compensating optical fibers. As a result, interference signals representing the outward phase shift of the sensing fibers are generated. These interference signals are later added to generate the optical phase shift $\Delta\phi$.

The I/O fiber 36 is coupled to the first sensing fiber 40 by the offset fusion splice 37. This splice permanently fuses the single and dual mode fibers 36 and 40 with their ellipses aligned. The splice can be formed, for instance, by heating the fibers to their respective melting points using electric arc and then bringing the fibers into contact to thereby form a seamless joint. The offset splice 37 allows the light beams of the dual-mode fibers to be coupled to the signal mode fiber 36.

The offset splice 46 is disposed between the first and second sensor fibers in a manner similar to the splice 37, except that it is actively controlled to excite two modes in the distal fiber 42. The reflecting mirror 48 is formed at the end of the distal or second sensing fiber 42 and is an integral part thereof.

The operation of the fiber optic sensor system 30 of the invention is described hereinafter. The broad band source 50 supplies low coherence light beams to the single-mode I/O fiber 36. The elliptic core of the single-mode fiber 36 allows light beams to propagate in fundamental transverse mode ($LP_{01}$) to the first sensing fiber 40. Here, the elliptic core of the first sensing fiber 40 permits light to propagate in dual transverse modes ($LP_{01}$ and $LP_{11}'$). The portion of the light in the first sensing fiber 40 propagates through the offset splice 46 to the second sensing fiber 42 and a portion of the light is reflected thereby towards the I/O fiber 36. The transmitted light propagates in the second sensing fiber 42 and is fully reflected by the reflecting mirror 48. Changes in the strain on the gun barrel resulting from different gun angles $\ominus$ result in a sensible strain on the fibers 40 and 42. In accordance with the invention, the phase of the reflected light changes according to the strains imposed on the fibers 40 and 42. This change in phase (i.e., $\Delta\phi_1$ and $\Delta\phi_2$) for light intensity results in a corresponding intensity change in the transverse spatial mode distribution of the low coherence light within the respective sensing fibers 40 and 42. The phase changes are carried to the coherent division multiplexer 54 which addresses and matches the phase changes. The matched phase changes are coupled to the summer 62 for processing to determine total phase change ($\Delta\phi$). The value of the total phase change $\Delta\phi$ is then employed to calculate the correct gun angle, i.e., to compensate for the deflection D at various gun angles $\ominus$.

The coherent light waves from the SLD source 50 travel to dual-mode sensing fibers 40 and 42 through the single-mode fiber 36 which is connected to the sensing fibers by splice 37. The splice causes the coherent light waves to be launched asymmetrically into the sensing fibers and to give equal excitations of two guided modes in the sensing fibers. Superposition of light waves in the guide modes generates radiation patterns within the sensing fibers, wherein one of the radiation patterns is subsequently picked up by the splice.

Strain imposed on the sensing fibers stretches the fibers and causes light waves in one of the guided modes to shift phase. Initially the light waves in both guided modes are in phase, so their amplitudes are added to give a bright spot. After the stretching, some waves in one of the modes are out of phase with waves in the other mode and destructive interference occurs giving a dark spot. In other words, the relative phase shift induced between the two modes in the sensor fibers will show up as a corresponding intensity variation. Accordingly, by monitoring the intensity of the radiation pattern in the sensor fibers, the optical phase difference between the guided modes can be measured.

The optical path difference (OPD) for each sensing fiber (i.e., path length imbalance between the arms of each sensing fiber) is greater than the coherence length (i.e., propagation distance over which light waves are considered coherent) of the SLD source. As a result, no interferometric light can be observed directly at the output of the sensor fibers. However, by using receiving interferometers within the coherent division multiplexer, to adjust (i.e., match) the optical path differences of the sensor fibers such that they are within the coherent length of the SLD source, interferometric signals can be generated in a known manner at the output of the coherent division multiplexer.

In accordance with the more detailed arrangement of FIG. 3, a first phase difference $\Delta\phi 1$ between the two propagation modes ($LP_{01}$ and $LP_{11}'$ even) within the first sensing fiber 40 may be expressed as follows:

$$\Delta\phi_1=\Delta\phi_{0(1)}+\int_a^b(\Delta\beta_1(x)x\epsilon_1(x,t))dx \tag{5}$$

Where $\Delta\phi_{o(1)}$ represents the known constant for the first sensing fiber 40; a and b denote the end points of the first sensing fiber 40; $\Delta\phi_{1(x)}$ represents the difference between the propagation constants of the two propagation modes and $\epsilon_1(x,t)$ represents the strain applied to the first sensing fiber 40 as a function of the gun angle $\ominus$.

The term $\epsilon_1(x,t)$ can be expressed as:

$$\frac{h_1(x)}{2} * \frac{\delta\theta_1}{\delta x}(x) \tag{6}$$

Where $h_1(x)$ represents the diameter of the barrel in the intermediate region 20 and the $\ominus_1$ represents the slope of the barrel. Substituting equation 5 into 6 results in the following expression representing the first phase angle difference $\Delta\phi 1$.

$$\Delta\phi = \Delta\phi_{0(1)} + \int_a^b\left(\Delta\beta_1(x) * \frac{h_1(x)}{2} * \frac{\delta\theta_1}{\delta x}(x)\right)dx \tag{7}$$

Where a conventional (non-tapered) dual-mode optical fiber in which the term $\Delta\beta_1(x)$ is a constant, evaluating in the integral is complicated because the diameter $h_1(x)$ of the intermediate section 20 changes in accordance with taper thereat. A complementary change in the term $\Delta\beta_1(x)$ would simplify the evaluation of the integral.

In accordance with the invention, the first sensing fiber is modified in such a way that $\Delta\beta_1(x)$ is a complement of $(h_1(x))/2$ so that the terms multiplied in the interval result in an arbitrary constant C. To achieve this, the diameter of the first sensing fiber 40 is varied in proportion to the diameter of the intermediate section 20 of the gun barrel 12. Accordingly, the propagation constant $\Delta\beta_1(x)$ along the length of the first sensing fiber changes inversely in the accordance with the diameter $(h_1(x))$ of the barrel in the intermediate section 20 so as to satisfy the condition (i.e., $\Delta\beta(x)*(h(X)/2)=C$. Substituting the constant C in the integral reduces equation (7) to $$\Delta\phi_1=\Delta\phi_{01}+C(\ominus_a-\ominus_{b1}) \tag{8}$$

where the angle $\ominus_a$ is the slope at the trunnion 16 and the angle $\ominus_{b1}$ is the slope of the barrel in the intermediate section 20.

In equation 8, the angle $\ominus_a=0$ because the trunnion is fixed. By substituting the phase difference $\Delta\phi_1$ of the propagation modes of the first sensing fiber, the slope of the intermediate region may be derived.

The foregoing rationale may be also applied to determine the second phase difference $\Delta\phi_2$ between the two propagation modes of light in the second sensing fiber 42 resulting in the following relationship $$\Delta\phi_2=\Delta\phi_{0(2)}+C(\Theta_a-\Theta_{b2}) \tag{9}$$

where $\Delta\Theta_{b2}$ is the angle of the end section 22.

In accordance with the invention by adaptively tapering the first and second sensing fibers 40 and 42, the propagation constants are varied such that a simplified mathematical expression results which is easily evaluated.

In the exemplary embodiment, the fiber optic sensor 30 of the present invention uses two sensing fibers 40 and 42 because the tapered barrel 12 of the gun has approximately 45% variation in diameter (i.e., D1/D2=157 mm divided by 305 mm). However, typical dual-mode optical fiber cannot be presently modified effectively so as to include more than about a 30% variation in diameter. Thus, by using two sensing fibers, a total variation up to about 60% in the diameter of the gun barrel 12 can be accommodated. The total phase difference $\Delta\phi$ of the sensing fibers and the total slope change $\Theta_b$ of the barrel 12 can be realized according to the following:

$$\Delta\phi=\Delta\phi_1+\Delta\phi_2 \tag{10}$$

and $$\Theta_b=\Theta_{b1}+\Theta_{b2} \tag{11}$$

Thus, in accordance with the invention, a simplified method for determining the gun angle has been provided.

The embodiment of FIG. 4, wherein reference numerals indicate similar components described with respect to FIG. 3, employs separate sensing fibers 40A and 42A. The light source 50 produces light to I/O fibers 36A and 36B via coupler 52A. The I/O fibers feed the first and second sensor fibers 40A and 42A respectively via the offset splices 37A and 37B. The light is reflected by the reflectors 48A and 48B and is processed in a manner similar to the arrangement of FIG. 3. In FIG. 4, the sensing fibers 40A and 42A each have a propagation constant which varies inversely with the radius of the tapered gun. This can be achieved by varying the radius of the fiber core in proportion to the gun radius. Alternatively, propagation may be controlled by varying the index of refraction of the core glass inversely with the gun radius. In either case, it is desirable to vary the propagation of the light inversely with the gun radius.

There has thus been described various embodiments of the invention and it will apparent to those skilled in the art that various changes and modifications may be made therein without departing from the invention. It is intended in the appended claims to cover such various changes and modifications to come within the true spirit and scope of the invention.

What is claimed is:

1. A fiber optic sensor for a tapered gun barrel having a muzzle and a trunnion comprising:

a single-mode I/O optical fiber secured to said trunnion;

a light source supplying light to said single-mode fiber, said single-mode fiber being used as an input/output fiber;

at least one dual-mode optical fiber secured to the muzzle cascaded in a longitudinal direction with said I/O fiber, said dual-mode fiber being used as a sensing fiber;

splicing means for connecting and aligning said single-mode fiber with said at least one dual-mode fiber; and reflective means attached to an end of said at least one dual-mode fiber at an end of said muzzle, wherein said dual-mode fiber has a propagation constant inversely proportional to the taper of the muzzle.

2. The sensor of claim 1 wherein said at least one dual-mode optical fiber is tapered such that a radius of said at least one dual-mode fiber is inversely proportional to corresponding radius of said muzzle.

3. The sensor of claim 1 further comprising coupling means for coupling said single-mode fiber to the dual mode fiber.

4. The sensor of claim 1 further comprising at least two dual-mode fibers and splicing means between each of said dual-mode fibers.

5. The sensor of claim 4 wherein the splicing means comprises a controlled offset splice.

6. The sensor of claim 4 further comprising coherent division multiplexing means connected to coupling means for addressing sensing information from said dual-mode fibers.

7. The sensor of claim 6 wherein the coherent division multiplexing means comprises an interferometer.

8. The sensor of claim 1 further comprising processing means for processing said multiplexed sensing information.

9. The sensor of claim 1 wherein the dual-mode fiber has a core tapered at an angle proportional to the taper of the muzzle.

10. The sensor of claim 1 wherein the dual-mode fiber has an index of refraction varying inversely to the taper of the muzzle.

11. The sensor of claim 1 further comprising a second single-mode fiber and a second dual-mode fiber connected thereto in cascade.

12. A method of sensing a gun barrel having a muzzle with a taper and a fixed trunnion, said method comprising:

inserting a single-mode optical fiber into said trunnion;

supplying light to said single-mode fiber, said single-mode fiber being used as an input/output fiber;

cascading at least one dual-mode optical fiber in a longitudinal direction with said I/O fiber within said barrel, said dual-mode fiber being used as sensing fibers;

connecting and aligning said single-mode fiber with said dual-mode fiber; and providing a reflective means to a far end of said dual-mode fiber at an end of said muzzle, wherein said dual-mode fiber has a propagation constant inversely proportional to the taper of the muzzle.

13. The method of claim 12 further including providing a splicing means between selected ones of the individual fibers.

14. The method of claim 13 wherein providing the splicing means comprises providing a controlled offset splice between the fibers.

15. The method of claim 12 wherein said dual-mode fiber is tapered such that a radius of said dual-mode fiber is proportional to a corresponding radius of said tapered muzzle of said barrel.

16. The method of claim 12 further comprising the step of multiplexing sensing information from said dual-mode fibers.

17. The method of claim 16 wherein the multiplexing step includes producing interference in reflected light carried by the fibers.

18. The method of claim 12 further comprising the step of processing said multiplexed sensing information.

19. The method of claim 12 wherein the processing step comprises detecting interference between modes propagated by the sensing fiber.

20. The method of claim 12 further including varying the index of refraction of the fiber inversely with the taper of the muzzle.

21. The sensor of claim 20 wherein the dual-mode fiber has a core tapered in proportion to the geometry of the system.

22. The sensor of claim 20 wherein the dual-mode fiber has an index of refraction varying inversely to geometry of the system.

23. A fiber optic sensor for a deformable elongated system having separated reference points and nonuniform geometry comprising:

a single-mode I/O optical fiber secured to said system between reference points;

a light source supplying light to said single-mode fiber, said single-mode fiber being used as an input/output fiber;

at least one dual-mode optical fiber secured between the reference points cascaded in a longitudinal direction with said I/O fiber, said-dual mode fiber being used as a sensing fiber;

splicing means for connecting and aligning said single-mode fiber with said at least one dual-mode fiber; and reflective means attached to an end of said at least one dual-mode fiber at an end of said system, wherein said dual-mode fiber has a propagation constant inversely proportional to the geometry of the system.

24. A method of sensing a deformation in an elongated system having separated reference points, said method comprising:

providing a single-mode optical fiber to said system between the reference points;

supplying light to said single-mode fiber, said single-mode fiber being used as an input/output fiber;

cascading at least one dual-mode optical fiber in a longitudinal direction with said I/O fiber within said system, said dual-mode fiber being used as sensing fibers;

connecting and aligning said single-mode fiber with said dual-mode fiber; and providing a reflective means to a far end of said dual-mode fiber at an end of said system, wherein said dual-mode fiber has a propagation constant inversely proportional to the deformation of the system.

* * * * *